United States Patent [19]
Tevis et al.

[11] Patent Number: 5,317,728
[45] Date of Patent: May 31, 1994

[54] STORAGE MANAGEMENT OF A FIRST FILE SYSTEM USING A SECOND FILE SYSTEM CONTAINING SURROGATE FILES AND CATALOG MANAGEMENT INFORMATION

[75] Inventors: Gregory J. Tevis; Ellen J. Waldo, both of Tucson, Ariz.

[73] Assignee: International Business Machines Corporation, Armonk, N.Y.

[21] Appl. No.: 578,386

[22] Filed: Sep. 7, 1990

[51] Int. Cl.$^5$ .............................................. G06F 15/40
[52] U.S. Cl. ............................ 395/600; 364/DIG. 1; 364/222.81; 364/282.1; 364/281.1
[58] Field of Search ............... 364/200; 395/725, 275, 395/425, 600

[56] References Cited

U.S. PATENT DOCUMENTS

| | | | |
|---|---|---|---|
| 4,104,718 | 8/1978 | Poublan et al. | 395/600 |
| 4,499,539 | 2/1985 | Vosacek | 364/200 |
| 4,574,346 | 3/1986 | Hartung | 395/425 |
| 4,638,424 | 1/1987 | Beglin et al. | 364/200 |
| 4,638,425 | 1/1987 | Hartung | 364/200 |
| 4,771,375 | 9/1988 | Beglin et al. | 364/200 |
| 4,876,662 | 10/1989 | Pence | 364/900 |
| 4,882,674 | 11/1989 | Quint et al. | 395/700 |
| 4,974,156 | 11/1990 | Harding et al. | 395/425 |
| 4,987,533 | 1/1991 | Clark et al. | 395/600 |
| 5,001,628 | 3/1991 | Johnson et al. | 395/600 |
| 5,018,060 | 5/1991 | Gelb et al. | 395/600 |
| 5,089,952 | 2/1992 | Bozman | 395/725 |
| 5,121,483 | 6/1992 | Monahan et al. | 395/275 |
| 5,175,852 | 12/1992 | Johnson et al. | 395/600 |
| 5,193,171 | 3/1993 | Shinmura et al. | 395/425 |
| 5,202,971 | 4/1993 | Henson et al. | 395/425 |
| 5,239,647 | 8/1993 | Anglin et al. | 395/600 |

Primary Examiner—Thomas C. Lee
Assistant Examiner—Wayne Amsbury
Attorney, Agent, or Firm—M. W. Schecter

[57] ABSTRACT

A first file system to assist in the storage management of a second file system not able to store its own management classes and management attributes. A repository file space in the first file system is used to accomplish the storage of some or all of the management classes or attributes for the files of the second file system. For each file in the second file system an empty file is created in the repository file space of the first file system. The creation of an empty file in the repository file space causes a management class to be selected for the file and stored in the catalog of the first file system as would be done for any file in the first file system. A naming convention is used to link each file in the repository file space with its associated file in the second file system. The additional files in the first file system are left empty as no other information need be stored for storage management purposes. The management attributes of the files are then compared to the management criteria represented by the management classes stored in the catalog of the first file system and the files are managed accordingly.

5 Claims, 3 Drawing Sheets

STORAGE MANAGEMENT OF A FIRST FILE SYSTEM USING A SECOND FILE SYSTEM CONTAINING SURROGATE FILES AND CATALOG MANAGEMENT INFORMATION

BACKGROUND OF THE INVENTION

1. Field of the Invention

The present invention relates to storage management across file systems. More particularly, the invention relates to storage management of both the minidisk and shared file systems in a virtual machine operating system environment in which at least some of the management classes for the minidisk file system files are stored in the catalog in the shared file system.

2. Discussion of the Related Art

Modern data processing systems include a host processor having one or more central processing units, a memory facility, an input/output system, and an interconnection system (i.e. a bus). The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

As computers manipulate ever increasing amounts of data they require larger quantities of data storage capacity. Computer memory is available in several forms. Generally, the faster data can be written to or read from a particular form of memory, the more expensive it is. Microchips are fast, but expensive, and are typically used as the primary or main memory in/to the host processor. Other available forms of memory are used as auxiliary or peripheral memory, and include numerous peripheral storage devices. For example, magnetic direct access storage devices (DASD), magnetic tape storage devices, and optical recording devices are all peripheral storage devices. These devices have a greater storage capacity and lower cost than main memory, but do not provide the same performance. For example, the time required to properly position a tape or disk beneath the read/write mechanism of a drive cannot compare with the rapid, purely electronic data transfer rate of main memory. It is, however, inefficient to store all of the data in a system in a single type of memory device. Simply storing all data in main memory is too costly and simply storing all data in a peripheral storage device significantly reduces performance. A physical portion of the total storage area of one or more peripheral storage devices is referred to as a "storage space".

A typical data processing system includes both main memory and one or more peripheral storage devices. A data processing system having a plurality of peripheral storage devices arranged hierarchically is referred to as a "data storage hierarchy". In a data storage hierarchy, primary or level 0 data storage generally refers to the level therein having the highest performance and lowest storage capacity.

Secondary or level 1 (or lower level) storage includes the (equal or) greater storage capacity, but at (equal or) reduced performance and thus reduced cost. The unit of data storage can be data sets, files, or objects. Data set and file are terms used essentially interchangeably in different operating system environments to mean a collection of data in a prescribed arrangement and described by control information to which the system has access. An object is a variably sized byte stream with no record or other internal boundary orientation. For convenience, the term "file" is used hereinafter to refer generically to data sets, files, objects or any such data entities. Data is moved and copied between different levels of the hierarchy as files (or some larger unit of data), as required, to balance performance, storage and cost. Such data transfers and related actions to manipulate a data storage hierarchy (such as the deletion of data which is no longer being used from the hierarchy) to achieve this balancing is known as "storage management".

Storage management includes several subcomponents, such as performance management, reliability management, capacity management, space management and availability management. Each of these may involve the transfer of data between levels of the hierarchy. Space management is the movement of data between different levels of the hierarchy so as to store data only in the most appropriate level of the peripheral storage hierarchy. For example, relatively active data should be stored in a relatively high performing level of the hierarchy and relatively inactive data should be stored in a relatively lower performing level of the hierarchy. As data ages, it is generally referenced less (i.e. relatively less active) and should thus be moved to lower levels of the data storage hierarchy. The movement of data from one level of a data storage hierarchy to another is referred to as "migration", and may include data compaction to save storage space.

Availability management is the backup of data within a data storage hierarchy to improve the likelihood of its being available if and when it is needed by the host processor. The original or primary copy of the data is not deleted; an additional or secondary copy is generated and transferred to another portion of the data storage hierarchy. The secondary copy is typically stored on a different peripheral storage device from the primary copy to ensure the availability of the data. If the primary copy of the data becomes unavailable, such as by device failure, the secondary copy of the data may still be referenced. The secondary copy of the data need not be stored in a different level of the data storage hierarchy, but such may be desirable as the secondary copy is not likely to be as active as the primary copy. Data backup may occur unconditionally or incrementally. Unconditional backup generates a copy of any specified file, incremental backup copies only those files which have been updated since the previous secondary copy was generated. Note that transferring a file by migration may include the maintenance of a primary copy of a file in level 0 storage. The primary copy is, however, an empty file—the data in the file having been transferred to the secondary copy of the file in level 1 storage.

Storage management is traditionally performed manually. The data owner decides when to migrate or backup data, and where such migrated and backup files should be stored. Such decisions are time consuming, usually requiring a review of each file stored. The operations involved are often so time intensive that manual reviews and decisions are not made until there is no alternative. For example, a user might not migrate any files to level 1 storage until all storage space in level 0 storage is in use. In large systems, or in any system storing relatively large amounts of data, it is simply impractical to perform storage management manually.

In recent years, computer software has become available which reduces the need for manual operations. The IBM Data Facility Hierarchical Storage Manager (DFHSM) application program is an example of such software. DFHSM is a utility to the IBM Multiple Virtual Storage (MVS) series of operating systems. DFHSM uses specified management criteria to manage files, including the automatic recall of a transferred file upon an attempt to reference the file by a user. The management criteria include the minimum length of time a file will be permitted to be resident in the data storage hierarchy or a particular level thereof before it will be eligible to be migrated or deleted or the maximum length of time a file will be permitted to exist without being backed up after being updated. Numerous management criteria are defined to the system and stored in a configuration file. The DFHSM management criteria are selected manually at the time of file identification to DFHSM. While DFHSM improves storage management, the manual selection of management criteria is still burdening.

In recent years, manual operations for storage management have been further reduced. System-managed storage is a term indicating that the system itself selects the management criteria for data and performs storage management. The storage administrator need only define the management criteria in a configuration file, the system itself selects the management criteria for a particular file upon its creation and manages it accordingly. An example of software providing system-managed storage is IBM Data Facility Storage Management Subsystem software, hereinafter referred to simply as DFSMS (DFSMS is a trademark of IBM Corporation). DFSMS is a subsystem of the IBM Multiple Virtual Storage (MVS) series of operating systems. DFSMS encompasses several subcomponents, including DFHSM and IBM Multiple Virtual Storage/Data Facility Product software, hereinafter referred to simply as MVS/DFP (MVS/DFP is a trademark of IBM Corporation).

DFSMS accomplishes the aforementioned with the addition of the automatic class selection (ACS) routine to MVS/DFP. The management criteria are defined in sets of such criteria (known by names such as storage and management classes, but hereinafter referred to simply as "management classes") in a configuration file and the ACS routine itself is defined once by the storage administrator for the system. As each file is identified to DFSMS, MVS/DFP uses the ACS routine to automatically select the management class therefor. ACS selects the management class based upon certain characteristics of a file, such as the name of the file, the owner of the file, the directory path to the file, and the size of the file. Once the ACS routine has selected the management class for a file, such management class is stored in one or more fields in a catalog existing in the host processor.

DFSMS must also provide for storage of the current data management attributes associated with each file. The management attributes are stored in one or more fields in the catalog, and/or the volume table of contents for each volume of data. The management attributes include certain data relating to the status and use of each file and are updated as such data changes during use. For example, the management attributes include the date and time a file became resident in the data storage hierarchy or a particular level thereof, the date and time a file was last accessed (whether the file was updated or not), and the date and time of last backup and update of the file.

One or more common DASD include one or more control files for storing control information also needed for storage management. These control files are not themselves managed by DFSMS, but may co-exist on common DASD with managed data files. A separate control file exists for each type of storage management activity (i.e. one control file for migration, one control file for backup, etc.). For example, a control file includes the information necessary to map migrated and secondary copies of files to their catalog and table of contents entries, and/or their primary copies (i.e. to their level 0 source files). Such mapping allows for recall of the correct migrated or secondary copy of a file upon specification of such file by a user. After determining that the primary copy of a file has been migrated, or that the secondary copy is required, the mapping data is used to locate and access the migrated or secondary copy of the file.

Actual storage management by DFSMS occurs during periods of relative system inactivity to minimize interference with other processing. During the prescribed periods, DFHSM is called to compare the management attributes of files to the management criteria of such files, as defined by the assigned management class. DFHSM then manages the files accordingly, transferring files and updating the management attributes and control information as required. In addition, storage management may be applied to units of data larger than a file. For example, a group of files having certain common management requirements may be established such that the entire group is managed as a whole. The group is assigned a management class of its own and managed accordingly. It should be understood that where files are hereinafter described as being managed during storage management, entire groups or other data units could be similarly managed, unless otherwise specified.

Another example of computer software to provide system-managed storage is IBM Data Facility Storage Management Subsystem for Virtual Machines software (hereinafter referred to simply as DFSMS/VM), which is a subcomponent of the IBM Virtual Machine (VM) series of operating systems. The currently available release 1 of DFSMS/VM does not provide space or availability management, but does provide several improvements to the VM operating systems. Traditionally, VM operating systems have used a minidisk file system (MFS) for organizing data for users on peripheral storage devices. MFS preallocates contiguous storage space (a consecutively addressed logical portion of a physical storage space) within the data storage hierarchy to individual users. Each preallocated contiguous storage space is known as a "minidisk" because it appears to be a complete peripheral storage device (such as a DASD) to the user. A minidisk is a set of consecutively addressed DASD cylinders. Each minidisk is owned by (i.e. assigned to) a particular user, no other users can store or access files thereon unless so authorized by the owning user. A minidisk (and MFS) is said to be "preallocated" because the storage space reserved to a user is typically larger than that immediately needed by that user. As a user fills a minidisk with files, there is a tendency to try to keep at least a portion of that minidisk available for new files by manually deleting the existing, unused files. The condition of "underutilization" refers to the remaining increments of unused storage space spread throughout the data storage hierarchy and results in a significant amount of wasted storage space. In addition, "fragmentation" results when a minidisk is deallocated from a particular user and cannot be reallocated to another user because it is too small to meet the needs of such other user.

A relatively new file system, known as the "shared" file system (SFS), is included in current releases of VM operating systems, such as Virtual Machine/System Product (VM/SP) release 6. Shared file systems significantly reduce underutilization and fragmentation problems as compared to MFS. However, because of the large number of existing VM operating systems users, the use of MFS has not been discontinued. Thus, SFS and MFS may exist simultaneously in a data storage hierarchy. SFS allows for the dynamic sharing of peripheral storage space among different users. Physical storage space is not preallocated to a user account. Instead, as each user actually stores a file, storage space is dynamically allocated for that file only. Users are given accounts to a file pool, which is simply a collection of files for a set of users. In VM operating systems, a file pool is a collection of minidisks owned by a single virtual machine that contain files for a number of users. Each user stores files in a logical file space within a SFS storage group, which is a collection of minidisks within a file pool. The storage space assigned to a file space changes dynamically as files are added thereto, deleted therefrom, or updated. The files in each file space can be organized into one or more directories (and subdirectories within each directory), the file space itself being a top level of the directory hierarchy.

SFS includes control information in level 0 storage as part of every file pool. The control information includes files of information used to locate minidisks in the respective file pool and to track which blocks of such storage space are in use. The control information also includes a catalog of information about the directories and files in the file pool, such as the owner of each file. Multiple file pools can exist for each instance of DFSMS/VM, each file pool being an instance of SFS.

If DFSMS/VM is to provide storage management for both MFS minidisks and SFS file pools (and the files of each), it must be able to store both the assigned management class and management attributes for each file or group of commonly managed files therein. This is relatively simple for SFS files because the SFS catalog has been designed with enough remaining storage space to accommodate storage of the management class and management attributes for each file or group of commonly managed files. A previously unrecognized problem is that of how to accommodate the storage of both management classes and management attributes for MFS files. The first cylinder of each MFS minidisk is used to store the catalog of information for the user files stored in the remaining files. No space remains in the allotted MFS catalog cylinder to accommodate the storage of both the management classes and the management attributes. One solution to this problem is to increase the number of cylinders allotted for the catalog. Such enlargement of the catalog would result in restructuring and reprogramming of VM operating systems and would have severe impact to existing applications expecting the precise current location of the catalog. Thus, a different solution to the problem is required.

SUMMARY OF THE INVENTION

In view of the foregoing, it is the principal object of the invention to improve storage management of file systems.

Another object of the invention is the storage management of a file system in which the catalog is too full to accommodate the storage of both the management classes and management attributes required for storage management.

Yet another object of the invention is the storage management of both MFS and SFS files in a single virtual machine operating system environment.

These and other objects are accomplished by using a repository SFS file space. An empty file is created in the repository SFS file space for each MFS file. A directory is created in the repository SFS file space for each MFS minidisk. The creation of an empty file and/or directory in the repository SFS file space causes the ACS routine to automatically select the management class for such file and/or directory and store an indication thereof in the SFS catalog as would be done for any SFS file or directory. A naming convention is used to link each file and/or directory in the repository SFS file space with its associated MFS file and/or minidisk. The additional SFS files are left empty as no other information need be stored for storage management purposes. DFSMS/VM compares the management attributes of the files to the management criteria represented by the management classes in the SFS catalog and manages the MFS files accordingly.

The foregoing and other objects, features, and advantages of the invention will be apparent from the following more particular description of the preferred embodiment of the invention, as illustrated in the accompanying drawing.

DETAILED DESCRIPTION OF THE PREFERRED EMBODIMENT

Figure 1:
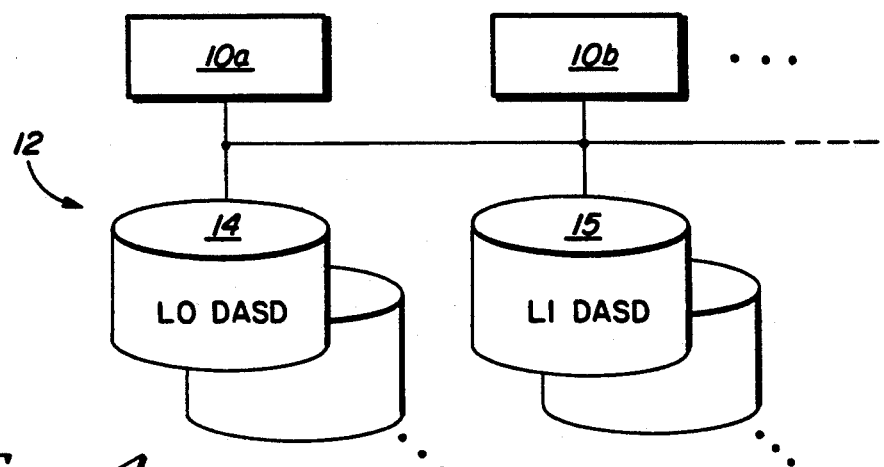
FIG. 1 is a schematic block diagram of a data storage hierarchy according to the invention.

Referring now more particularly to the drawing, like numerals denote like features and structural elements in the various figures. The invention will be described as practiced in a network of multi-host processor data processing environments each having a plurality of peripheral data storage devices. It should be understood that the invention may also be practiced in a variety of data processing system structures, such as those having a smaller number of peripheral data storage devices, different types of peripheral data storage devices, or single host processor environments.

Referring to FIG. 1, a data storage hierarchy 12 in a multi-host processor environment will now be described. The system includes two or more host processors, such as a host processor 10a and a host processor 10b, each including the usual component portions of a host processor, such as the arithmetic logic unit, control unit, etc. Each host processor can be a uniprocessor or multiprocessor. An example of a host processor which may be used in the data processing system shown is the IBM 3090 mainframe computer. Each host processor may employ one or more operating systems to supervise the operations thereof. In the preferred embodiment, the host processors are uniprocessors using an IBM VM operating system.

Host processors 10a and 10b are coupled to relatively high and relatively low performance DASD for storing relatively active and relatively inactive data, respectively. High performance DASD 14 are part of level 0 ("L0") of data storage hierarchy 12. Level 0 is the highest level of the hierarchy. Low performance DASD 15 are part of level 1 ("L1") of data storage hierarchy 12. Level 1 is the next highest level (or at least, some relatively lower level) of the hierarchy. An example of a DASD which may be used in data storage hierarchy 12 is the IBM 3380 or IBM 3390 DASD. High performance DASD 14 could be IBM 3390 DASD and low performance DASD 15 could be IBM 3380 DASD, or high performance DASD 14 could be cached and low performance DASD 15 could be without cache, etc. Each DASD stores a volume of data. Hierarchy 12 could also include additional storage levels, or different types of peripheral storage devices, such as tape drives. Note that level 0 storage and level 1 storage could simply be logical partitions of the same performance peripheral storage device. Thus, in some embodiments, it is possible to have a single peripheral storage device shared among both level 0 and level 1 storage.

The remaining components of the data processing system, such as the system console(s), are not shown in the drawing. The dotted and dashed lines represent possible additional system components. Additional host processors and peripheral storage devices, including other types of peripheral storage devices, could be added as required. The ability to add system components is limited only by the connectivity of the components. The remaining and additional data processing system components, and details of the connections between the components, are not shown in the drawing, but are well known.

Figure 2:
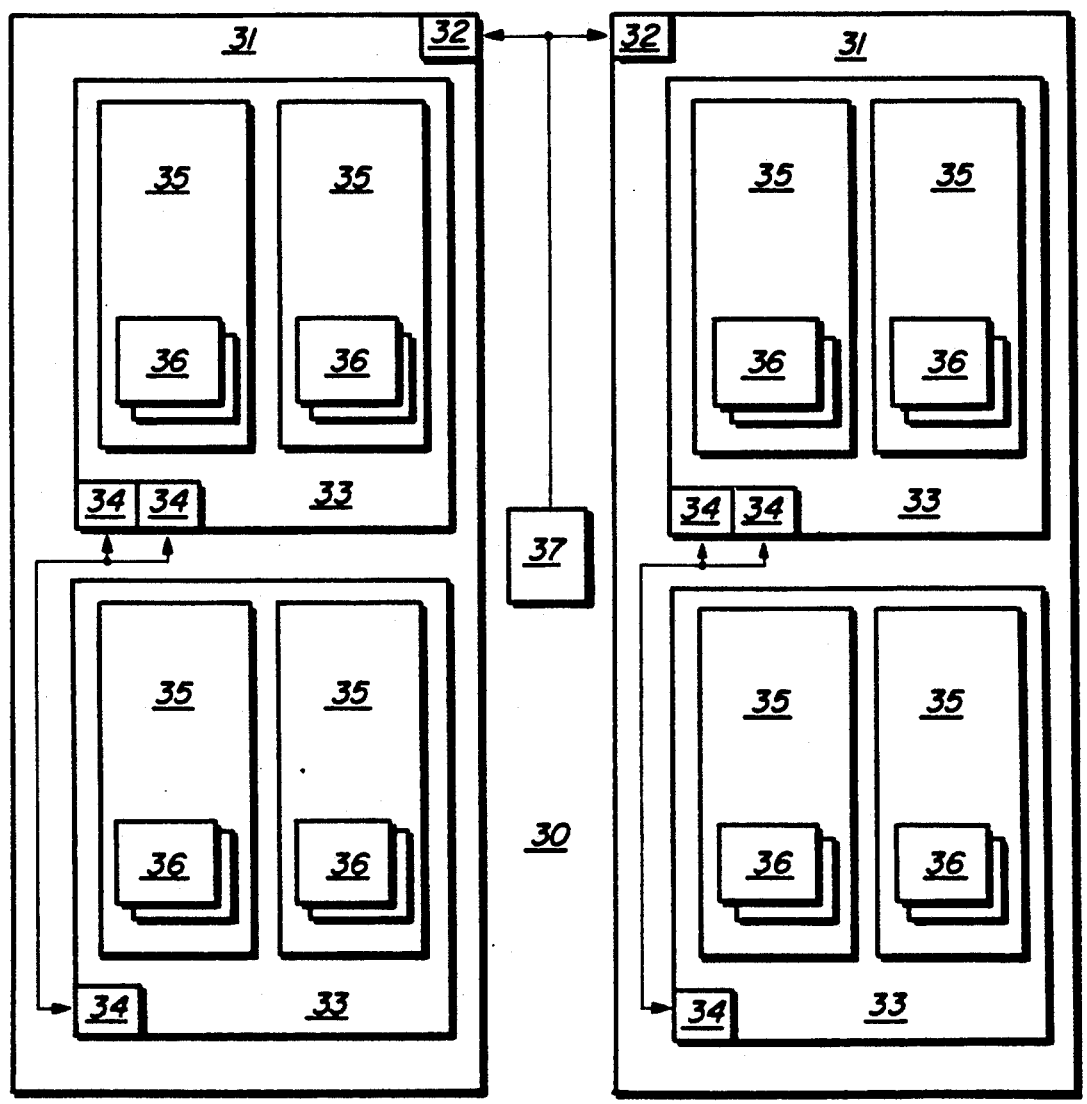
FIG. 2 is a schematic block diagram of a series of operating system environments according to the invention arranged in a network.

Referring to FIG. 2, a series of VM operating systems, each running DFSMS/VM, is shown arranged in a network 30. A network is a set of two or more computer systems linked in such a way as to let data be transmitted between them. Here, network 30 is designed according to the IBM Systems Network Architecture (SNA). Network 30 is divided into a series of subnetworks 31 (two are shown) coupled by gateways 32. Each subnetwork 31 includes one or more transparent services access facility (TSAF) collections 33 (four are shown) each coupled by one or more gateways 34. TSAF is a component of a VM operating system that handles communications with other operating systems by proper routing of the communications. A TSAF collection is a group of up to eight interconnected VM operating systems. A gateway is a uniquely named logical unit for a subnetwork 31 or TSAF collection 33 used for communications therebetween. Gateways 32 and 34 are communication servers including a logical processor which provides the protocol for communications between subnetworks 31 and TSAF collections 33. Here, the IBM Advanced Program-to-Program Communications for VM (APPC/VM) protocol is used. Further description of the network structure can be found in IBM Manual SC24-5378-00, VIRTUAL MACHINE/SYSTEM PRODUCT CONNECTIVITY PLANNING, ADMINISTRATION AND OPERATION RELEASE 6 and IBM Manual SC24-5377-00, VIRTUAL MACHINE/SYSTEM PRODUCT CONNECTIVITY PROGRAMMING GUIDE AND REFERENCE RELEASE 6 which are available from IBM Corporation and which are hereby incorporated by reference.

Each VM operating system 35 of TSAF collection 33 (two are shown for each TSAF collection 33) includes DFSMS/VM. The VM operating system including the DFSMS/VM application is provided to a host processor on a data storage medium and uploaded to main memory as required. Within each VM operating system 35 is one or more SFS file pools 36 (and SFS storage groups within a file pool) and/or one or more MFS minidisks (not shown). A file pool (or storage group) 37 is part of one of the VM operating systems and includes a file space owned by DFSMS/VM (i.e. assigned to the user id that is DFSMS/VM). Users of network 30 could also be assigned file spaces in file pool 37. The use of the file space owned by DFSMS/VM is shared among all VM operating systems 35 in network 30. Additional file spaces owned by DFSMS/VM may be created, such as one file space for each type of storage management, or a single integrated file space may be used. Also, if a single file space owned by DFSMS/VM is used, a directory could be created within the file space for each type of storage management, or a single integrated directory may be used.

Figure 3:
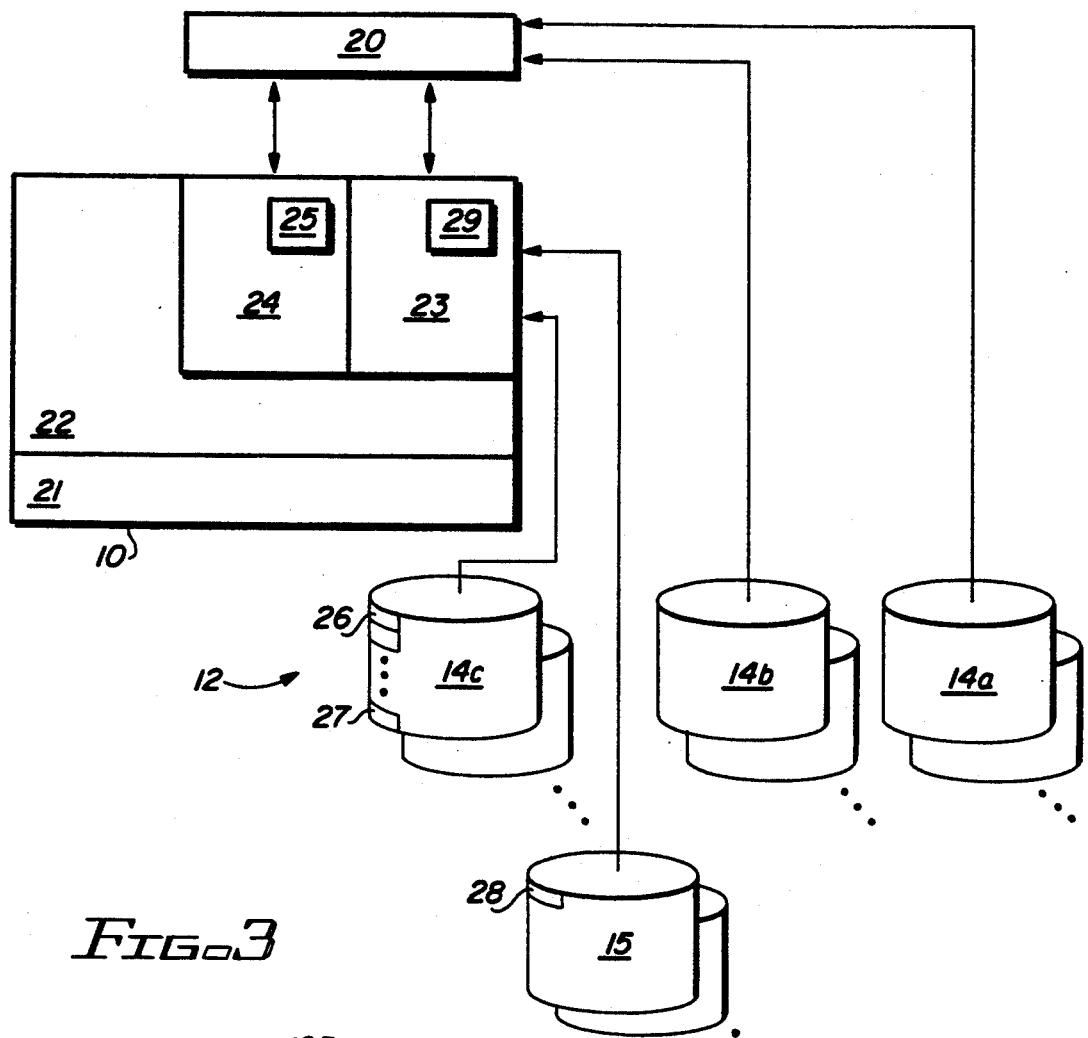
FIG. 3 is a schematic block diagram of an operating system environment in the data storage hierarchy and network of FIGS. 1 and 2 according to the invention.

Referring to FIG. 3, an individual IBM VM operating system environment employing DFSMS/VM according to the invention will now be described. One or more user terminals 20 interact with a host processor running the operating system through input/output terminals. The terminals are coupled to one or more host processors 10 running the IBM VM operating system which is in turn coupled to peripheral storage devices to create a data storage hierarchy 12. The VM operating system includes two basic components shown in the drawing, the control program (CP) 21 and the conversational monitor system (CMS) 22.

CP 21 manages the processor environment to make it appear to each user that he is in an independent and fully functional processor environment. These virtual machines appear to operate independently and simultaneously. CP 21 also monitors and manages system resources, controls the recovery from hardware problems, and accounts for system usage. Usually, a user requires some other operating system to actually do useful work, such as CMS 22.

The VM operating system supports its own interactive component, CMS 22, which is actually an operating system that runs only on a virtual machine. CMS 22 provides for two-way conversation between users and the system—allowing users to develop and execute application programs, communicate with other users, and create and edit files. CMS 22 includes two known file systems to create and edit files, MFS and SFS 23 (including file servers therefor), as previously described. MFS is represented by the coupling of users 20 to level 0 DASD 14a and 14b. DASD 14a is a CMS minidisk and DASD 14b is a non-CMS minidisk used for level 0 storage. SFS 23 is coupled to level 0 DASD 14c and level 1 DASD 15 and includes SFS catalog 29.

A single instance of SFS is shown in the drawing (i.e. one file pool), but a plurality of such could be included. CMS 22 also supports other programs for various applications. Further description of these components of the VM operating system may be found in IBM Manual SC24-5284-01, VIRTUAL MACHINE/SYSTEM PRODUCT APPLICATION DEVELOPMENT REFERENCE FOR CMS RELEASE 6; IBM Manual SC24-5367-00, VIRTUAL MACHINE/SYSTEM PRODUCT CMS SHARED FILE SYSTEM ADMINISTRATION RELEASE 6; IBM Manual SC24-5369-00, VIRTUAL MACHINE/SYSTEM PRODUCT USING RELEASE 6 ENHANCEMENTS RELEASE 6; all of which are available from IBM Corporation and are hereby incorporated by reference.

Another component of the VM/SP operating system shown in the drawing is DFSMS/VM 24, as is known, but modified to be a centralized and system-managed storage management facility. According to the invention, DFSMS/VM may include both space and availability management. In different embodiments, both availability and space management are provided for MFS files and SFS files, availability management is provided for both MFS files and SFS files and space management is provided only for SFS files or vice-versa, or either availability management or space management only is provided for both MFS and SFS files. In the embodiment described here, availability management is provided for both MFS files and SFS files and space management is provided only for SFS files.

ACS routine 25 is used in DFSMS/VM 24 as it is in DFSMS. APPC/VM protocol is used for communications between SFS 23 and DFSMS/VM 24, and for communications between users 20 and SFS 23 or DFSMS/VM 24. The remaining interfaces, basic operating principles, and directories and catalogs of DFSMS/VM, except as described herein, are similar to those of existing releases of DFSMS or DFSMS/VM. Further information on how DFSMS/VM is implemented can be found in supporting documentation such as IBM Manual GC-26-4604-01, DFSMS/VM GENERAL INFORMATION RELEASE 1; IBM Manual SC26-4605-00, DFSMS/VM USER'S GUIDE; IBM Manual LY27-9583-00, DFSMS/VM DIAGNOSIS RELEASE 1 or in the supporting documentation of its predecessors in storage management such as IBM Document G321-5349-00, SYSTEM MANAGED STORAGE, reprinted from IBM Systems Journal Vol. 28, No. 1, pp.77-103, 1989; IBM Manual GG24-3403-00, DFSMS IMPLEMENTATION PRIMER SERIES: WRITING ACS ROUTINES; IBM Manual SC26-4514-01, MVS/ESA STORAGE ADMINISTRATION REFERENCE VERSION 3 RELEASE 1; IBM Manual GC26-4507-01, MVS/ESA DATA FACILITY PRODUCT GENERAL INFORMATION VERSION 3; IBM Manual SH35-0083-04, DATA FACILITY HIERARCHICAL STORAGE MANAGER SYSTEM PROGRAMMER COMMANDS REFERENCE VERSION 2 RELEASE 5. All of the aforementioned documents are available from IBM Corporation and are hereby incorporated by reference. Further information is available in U.S. Pat. Nos. 4,638,424, 4,771,375, and 4,876,662, which are also hereby incorporated by reference. User terminals 20, SFS 23 and DFSMS/VM 24 are implemented as virtual machines under CP 21. CMS 22 is actually incorporated into these virtual machines, but is shown separately to demonstrate its function.

Storage management of the files in data storage hierarchy 12 requires the storage of management criteria and management attributes. The management criteria are defined as management classes in a configuration file as part of the control information. SFS catalog 29 stores the management classes selected by ACS routine 25 for each SFS file. SFS catalog 29 also stores the management attributes for each SFS file. Storage management of the SFS files includes the usual comparison of the management criteria represented by the management classes to the management attributes, and any actions required thereby. Each level 0 storage space 26 of a SFS file space may include one or more directories and subdirectories. These logical groupings of files may similarly be assigned a management class and managed by DFSMS/VM 24. Further description of these data structures can be found in the aforementioned documents incorporated by reference.

To accommodate the storage of both the management class and management attributes for MFS files and minidisks, a single repository SFS file space having level 0 storage space 27 on DASD 14c is created. The repository file space can be located in file pool 37 and is owned by DFSMS/VM 24. For each MFS file identified to DFSMS/VM 24, an empty file is created in the repository file space. For each such MFS minidisk, a directory is created in the level 0 portion 27 of the repository file space. The creation of each empty file or directory in the level 0 portion 27 of repository file space causes ACS routine 25 to automatically select a management class for such file or directory and store an indication of such in SFS catalog 29 as would be done for any SFS file or directory. The SFS files associated with the MFS files are left empty as no other information need be stored for storage management. DFSMS/VM 24 compares the management attributes stored in the MFS catalog (not shown for convenience) and the management criteria represented by the management class in SFS catalog 29, and manages the MFS files and minidisks accordingly. Thus, storage management is accomplished for both file systems using the SFS file system to "assist" the storage management of the MFS file system.

A naming convention is used to map a MFS file or minidisk to its associated SFS file or directory in the level 0 portion 27 of the repository file space. The directories are named as follows:

filepoolid:DFSMSxxx.MINIDISKMAP.fqluname.smsglobresid.mdowner.vaddr where:

"filepoolid" is the file pool name.

"DFSMSxxx" is the file space name. This name form signals DFSMS/VM 24 that the repository file space is to be managed by DFSMS/VM, but that files therein are not themselves to be migrated.

"MINIDISKMAP" is a constant name which clearly distinguishes a repository file space for availability management from a repository file space for other storage management functions (such as space management). Note that a single repository file space could be used for all storage levels.

"fqluname" is the combined (concatenated) name of subnetwork 31 and gateway 34. This uniquely identifies the TSAF collection 33 that the minidisks being managed reside in and is obtained from parameters specified by the storage administrator of DFSMS/VM 24.

"smsglobresid" is the TSAF collection-wide APPC/VM resource name for the VM operating system 35 and DFSMS/VM 24 which is managing the minidisks, uniquely identifying such within a TSAF collection 33. This also is obtained from the control file of DFSMS/VM 24.

"mdowner" is the user name of the owner of the minidisk being managed.

"vaddr" is the virtual address of the minidisk being managed.

To access a file, the file name and file type are also required. The files within the directories of the repository file space have the same file names and file types as the MFS files they represent. The repository file space can be placed in its own SFS storage group to minimize its effect on the performance of other SFS users.

The same naming scheme is used in conjunction with a SFS internal identifier to allow level 1 storage to be shared across network 30 for space management. File pool 37 includes a file space, which may be the repository file space, having some common level 1 storage space 28 therein. Storage space 28 is thus used to store all of the migrated SFS files for network 30, regardless of their owner and source location. The naming scheme is used to inherently and uniquely identify a migrated SFS file or directory, regardless of the file pool 36, operating system 35, TSAF collection 33, and subnetwork 31 from which the SFS file was migrated. The directories are named as follows:

filepoolid:DFSMSxxx.MIGRATIONLEVEL1.f-
    qluname.smsglobresid.filepool.storagegroup where:
"filepoolid", "DFSMSxxx", "fqluname", and "smsglobresid" are as previously described.

"filepool" is the file pool from which the SFS file was migrated.

"storagegroup" is the storage group from which the SFS file was migrated.

To locate a migrated SFS file, the file name and file type are also required. The files within storage space 28 have a file name and a file type which is created from a SFS internal identifier for the associated level 0 source file. SFS 23 uses the internal identifier in existing releases of VM operating systems to uniquely identify a file within a file pool 36. This is required because multiple users have access to the same file pool and may thus each place a file therein having the same file name and file type. The SFS internal identifier allows SFS 23 to differentiate between such otherwise commonly named files. In the preferred embodiment, the naming scheme uses an eight EBCDIC character file name and an eight EBCDIC character file type. The SFS internal identifier is translated from 8 characters of binary data (as used within SFS 23) into 16 EBCDIC characters representing hex code, one hex code character per each half byte of binary data, for use in the directory of storage space 28.

In the described manner, each SFS source file or directory in network 30 is uniquely identifiable in the storage space 28 or a directory thereof. Storage space 28 can thus be used to store all of the level 1 SFS migration files for the entire network 30, thereby reducing the overhead that is associated with maintaining file spaces and/or storage devices for level 1 storage of each file pool 36, VM operating system environment 35, TSAF collection 33, etc. If in an alternative embodiment space management is similarly provided for MFS files, the naming convention would use "mdowner" and "vaddr" instead of "filepool" and "storagegroup" to uniquely identify the level 1 MFS files.

By inherently guaranteeing the uniqueness of a SFS file name across network 30 in the naming scheme itself, the need for control files similar to those used in DFSMS for mapping migrated files to their primary copy is eliminated. If the naming scheme is similarly used for common level 1 storage for other types of storage management in addition to space management, a single file space can be used for level 1 storage for each type of storage management, or a separate file space may be used for level 1 storage for each space management function. If the naming scheme is similarly used for common level 1 storage in availability management, the control files for mapping may not be entirely eliminated because some mapping is still required to link the primary copy of a file to the secondary copies of a file.

METHOD OF OPERATION

Figure 4:
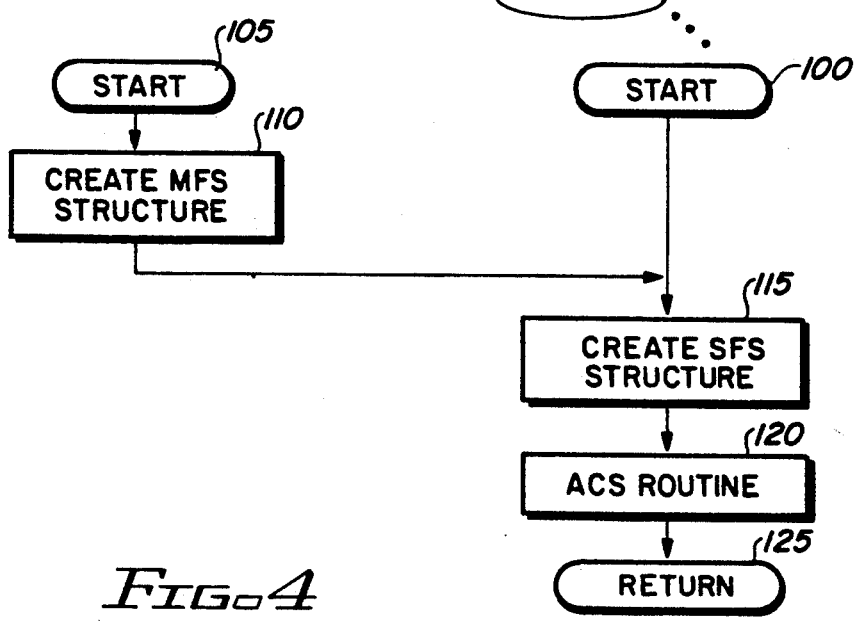
FIG. 4 is a flow diagram of the operations for defining a file to the storage management subsystem according to the invention.

Referring to FIG. 4, the method of defining a data entity to DFSMS/VM according to the invention will now be described. Operations begin at step 100 or step 105 upon the call of the host processor, depending upon whether the data entity is a SFS file or directory, or a MFS file or minidisk respectively. For a SFS file or directory to be managed by DFSMS/VM, such file or directory is created at step 115. At step 120, the ACS routine assigns the management class to the file or directory, which is stored in the SFS catalog. The flow then returns at step 125. For a MFS file or minidisk, such file or minidisk is created at step 110. Then, at step 115, an empty SFS file is created in the repository file space corresponding to the MFS file (and/or a SFS directory corresponding to the MFS minidisk). The ACS routine again assigns a management class at step 120 and the flow again returns at step 125.

Figure 5:
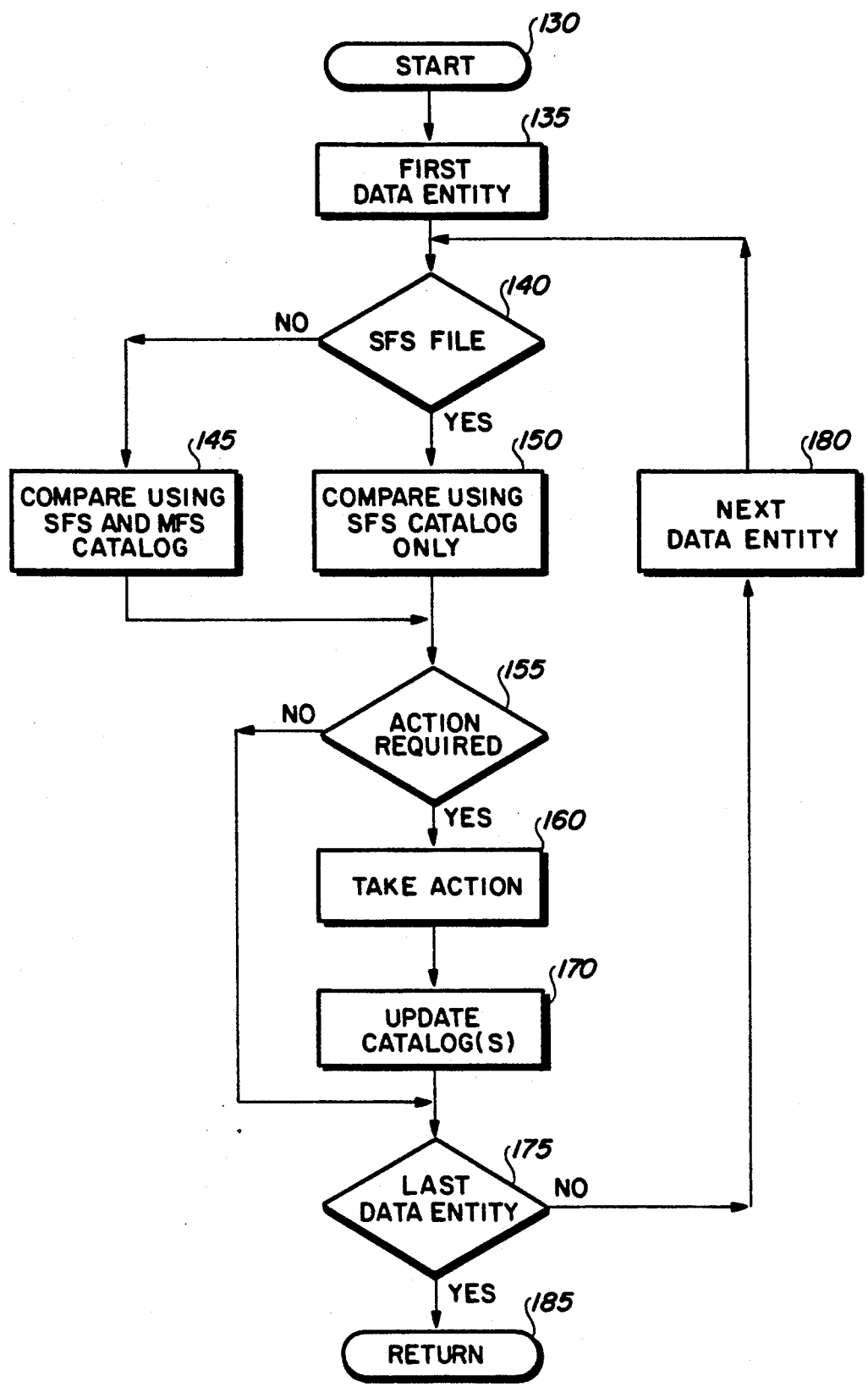
FIG. 5 is a flow diagram of the storage management operations according to the invention.

Referring to FIG. 5, the storage management operations of DFSMS/VM according to the invention will now be described. DFSMS/VM is called by the host processor to manage the storage at step 130. At step 135, DFSMS/VM examines the first data entity to be managed, as listed in the SFS catalog and/or MFS catalog. Step 140 branches according to whether the first such item in the list is a SFS file (or directory), or a MFS file (or minidisk). If the first data entity is a MFS file or minidisk, DFSMS/VM compares the management criteria represented by the management class in the SFS catalog to the management attributes of the data in the MFS catalog at step 145. If the first data entity is a SFS file or directory, DFSMS/VM compares the management criteria represented by the management class in the SFS catalog to the management attributes of the data in the SFS catalog at step 150. If no management action is required, step 155 branches to step 175. If any action is required, such as a data migration, backup, or deletion, such action is taken at step 160. Such action includes the use of the naming scheme to inherently and uniquely identify a level 1 file across the network. The relevant subcomponents of the aforementioned naming scheme are acquired and concatenated for use as required. Data transfers may be accompanied by data compaction. Step 160 may also include updating the relevant directory entries to reflect any change in the status of the data, such as an indication that a file has been migrated or that a secondary copy of the file exists. At step 170, the management attributes in the SFS catalog (and, possibly, also the MFS catalog) are updated to reflect the action taken. Step 175 then branches according to whether there is another data entity that has not yet been examined for storage management. If there is another data entity, the flow branches to step 180 to examine the next data entity and then returns to step 140. If there are no more files to examine, DFSMS/VM returns control to the host processor at step 185.

Pseudocode listings according to the invention are provided below. The first listing is for defining MFS files and minidisks to DFSMS/VM and for the selection of management classes therefor.

While the invention has been shown and described with reference to a preferred embodiment thereof, it will be understood by those skilled in the art that various changes in form and detail may be made therein without departing from the spirit, scope and teaching of the invention. For example, in FIG. 2, the number of networks, TSAF collections, VM systems, file pools . . . . could be varied.

Accordingly, the invention disclosed herein is to be limited only as specified in the following claims.

What is claimed is:

```
/* System managed storage of minidisks using SFS as a      */
/* repository to store management classes.                  */
/* This routine handles only the availability management    */
/* of MFS files function.                                   */ input:

minidisk_backup_repository_filepoolid   char(8),
    minidisk_backup_repository_filespace    char(8),
    fully_qualified_luname                  char(16),
    DFSMS_global_resource_id                char(8),
    #_of_minidisks                          fixed(31), minidisk_list                           array(#_of_minidisks)
       owner                                char(8),
       virtual_address                      char(4);

declare:

minidisk_backup_repository_name   constant('MINIDISKMAP');

do i = 1 to #_of_minidisks; /* for each minidisk inputted */

/* build minidisk backup repository directory name by      */
```

```
/* concatenating input values                                    */
  mbr_dirname=minidisk_backup_repository_filepoolid ||':'||
              minidisk_backup_repository_filespace  ||'.'||
              minidisk_backup_repository_name       ||'.'||
              fully_qualified_luname                ||'.'||
              DFSMS_global_resource_id              ||'.'||
              minidisk_list(i).owner                ||'.'||
              minidisk_list(i).virtual_address;

if (mbr_dirname directory does not exist)  then
     create directory mbr_dirname using SFS DMSCRDIR CSL
     call;

create list_of_files_to_be_managed from the CMS minidisk
  directory;

create list of files in mbr_dirname using SFS DMSOPDIR and
  DMSGETDI CSL calls;

do j = 1 to #_of_files_on_minidisk;  /* for each file on */
                                       /* minidisk         */ if (list_of_files_to_be_managed(j) has no corresponding
     file of the same filename and filetype in mbr_dirname)
     then
        create an empty file of this filename and filetype in
        mbr_dirname using SFS DMSOPEN CSL call;

if (this is an unconditional backup)    then
```

```
      call backup_file(list_of_files_to_be_managed(j));

else do;        /* incremental backup                    */ call SMS_processing_decision passing the management class of the file in mbr_dirname and the file's management attributes;
        if decision is BACKUP_FILE_DECISION    then call backup_file(list_of_files_to_be_managed(j));

end;          /* incremental backup do                 */ end;            /* do for #_of_files_on_minidisk         */ end;              /* do for #_of_minidisks                 */
```

The second listing is for space management of SFS files and directories. "MC" means management class; "ML1" means level 1 storage for migrated data. "Null" means that a set of blanks have been purposefully assigned as the management class for a file or directory. The listing first shows obtaining a null, non-existent, or otherwise (regularly) assigned management class for a file, with a default to obtaining a null, non-existent, or otherwise (regularly) assigned management class for a directory if the management class for a file is null. The listing then shows data expiration and migration decisions/actions based on the management class and management attributes.

```
/* Obtain MC definition and make initial decision based   */
/* on MC Name                                             */ select on the File_Management_Class input parameter:
     when (null) then
          select on the Directory_Management_Class input
            parameter:
          when (null) then
           get the system default's management
             class/criteria
           if that management class does not exist in the
             current configuration then
               Output a no management class error message
               goto EXIT_POINT
           else if other error occurred,
               Output an internal error message
               goto EXIT_POINT
          when (no management class indicator) then
             if the command issued input parm is MIGRATE then
                if File_Record_Size input parm > 0 then
                   Decision = MIGRATE
                   Migrate_Age = 0
                endif
             else (command is MANAGE)
                Decision = NO_ACTION
             endif
          otherwise
             get the directory's management class/criteria
```

```
       if that management class does not exist in the
         current configuration then
            Output a no management class error message
            goto EXIT_POINT
         else if other error occurred,
            Output an internal error message
            goto EXIT_POINT
   endselect when (no management class indicator) then
   if the command issued input parm is MIGRATE then
      if File_Record_Size input parm > 0 then
         Decision = MIGRATE
         Migrate_Age = 0
      endif
   else (command is MANAGE)
      Decision = NO_ACTION
   endif otherwise
   get the file's management criteria
   if that management class does not exist in the
     current configuration then
      Output a no management class error message
      goto EXIT_POINT
   else if other error occurred,
      Output an internal error message
      goto EXIT_POINT
endselect
```

```
       if Decision = MIGRATE or NO_ACTION then
          goto EXIT_POINT

/* Make expiration decision based on MC Definition       */ if the Command_Issued input parm is MANAGE  and
          the Date_of_Creation input parm > 0      and
          the Date_of_Last_Reference input parm > 0 then
           do
              if both expire-after-days-nonusage MC criteria
                and
                expire-after-date/days MC parameter are NOLIMIT
                  then
                    do
                        file is not to be expired
                    end
                else if expire-after-days-nonusage = NOLIMIT
                or expire-after-days-nonusage <= (current-date
                          minus Date_of_Last_Reference input parm)
                  then
              /* the two previous conditions mean that the    */
              /* expire-after-days-nonusage is either inappli-*/
              /* cable (NOLIMIT) or fulfilled.  In either     */
              /* case, the expire-after-days-attribute must   */
              /* now be fulfilled to expire the file.         */
                    do
                        if expire-after-date/days specifies an
                              absolute date that is <= current date
                           or expire-after-date/days specifies a
```

```
                    number that is <= (current-date minus

Date_of_Creation input parm)

or expire-after-date/days = NOLIMIT then file is to be expired else file is not to be expired endif end else do file is not to be expired end endif if file is to be expired then if the Expiration Disposition MC criteria =
           ENTIRE then Decision = EXPIRE_FILE_ENTIRE else Decision = EXPIRE_FILE_DATA_ONLY endif endif· end endif if Decision = EXPIRE_FILE_ENTIRE or EXPIRE_FILE_DATA_ONLY goto EXIT_POINT
```

```
/* Make migration decision based on the MC Definition   */
/* for those files not eligible for expiration          */ select on Command-or-Auto-Migrate MC criteria
    when (NONE)
        do
            Decision = NO_ACTION
        end
    when (BOTH)
        do
            if the Command_Issued input parm is MIGRATE then
                do
                    if File_Record_Length > 0 then
                        Decision = MIGRATE
                        Migrate_Age = 0
                    endif
                end
            else (command is MANAGE)
                do
                    if Date_of_Last_Reference input parm > 0
                    and Primary-Days-Non-Usage MC criteria <=
                            days since Date_of_Last_Reference
                            input parm
                    and Storage_Level input parm = PRIMARY
                    then
                        do
                            if File_Record_Length > 0 then
                                Decision = MIGRATE
                                Migrate_Age = Current-Date minus
```

```
                        minus Date_of_Last_Reference
                endif
            end
        else
            do
                Decision = NO ACTION
            end
        end
    end
when (COMMAND)
    do
        if the Command_Issued input parm is MIGRATE then
            do
                if File_Record_Length > 0 then
                    Decision = MIGRATE
                    Migrate_Age = 0
                endif
            end
        else
            Decision = NO_ACTION
        end
    otherwise
        do
            Output invalid MC parameter Error message
        end
```

---

The third listing is for the generation of file and directory names in creating and accessing data migrated to level 1 storage.

Translate 8 byte hex internal identifier (ID) to 16 byte EBCDIC character filename and filetype. Each half byte of the ID (hex) represents a hex value between '0'x and 'F'x. These numeric values are translated into their full byte EBCDIC characters '0' through 'F'. The resulting 16 EBCDIC characters will be the filename and filetype of the owned storage file.

Obtain filepool id and ML1 owned storage from DFSMS/VM control file

Obtain fully qualified lu name from DFSMS/VM control file

Obtain resource id from DFSMS/VM control file

Obtain the storage group from the first two bytes of the ID

Obtain the filepool from the input parameter

Construct the directory of the file in owned storage with the above information in the following format Filepoolid:DFSMSxxx.MIGRATIONLEVEL1.fqluname.
SMSglobresid.filepool.storagegroup While the invention has been shown and described with reference to a preferred embodiment thereof, it will be understood by those skilled in the art that various changes in form and detail may be made therein without departing from the spirit, scope and teaching of the invention. For example, in Figure 2, the number of networks, TSAF collections, VM systems, file pools . . . could be varied. Accordingly, the invention disclosed herein is to be limited only as specified in the following claims.

What is claimed is:

1. A data storage hierarchy comprising:
   peripheral level 0 storage including a first storage space having a plurality of files thereon organized according to a first file system and a second storage space having a plurality of files thereon organized according to a second file system, the first file system including a first catalog storing information associated with the files therein and the second file system including a second catalog storing information associated with the files therein, the first storage space including a repository file space having an empty file therein for each file organized according to the second file system and on the second storage space, the first catalog storing first management information for storage management of the files organized according to the second file system and on the second storage space by means of the file entries in said repository file space;
   peripheral level 1 storage;
   a host processor coupled to the peripheral level 0 and peripheral level 1 storage;
   management means coupled to the host processor for moving and/or copying the files on the second storage space, between level 0 and level 1 storage to balance performance, storage, and cost, using the first management information; and
   a catalog of second management information for storage management of the files on the first storage space and management means coupled to the host processor for instructing the host processor to manage the files on the first storage space using the second management information.

2. The data storage hierarchy of claim 1 wherein the first file system is shared filed system which dynamically allocates storage space among a plurality of first file system users as their files are stored therein and the second file system is a preallocated file system which allocates contiguous storage space to each of a plurality of second file system users prior to their files being stored therein.

3. A data storage hierarchy comprising:
   peripheral level 0 storage including a first storage space having a plurality of files thereon organized according to a first file system and a second storage space having a plurality of files thereon organized according to a second file system, the first file system including a first catalog storing information associated with the files therein and the second file system including a second catalog storing information associated with the files therein, the first storage space including a repository file space having an empty file therein for each of the files organized according to the second file system and on the second storage space, the first catalog storing first management information for storage management of the files organized according to the second file system by means of the file entries in said repository file space and on the second storage space and second management information for storage management of the files organized according to the first file system and on the first storage space, the second catalog not able to store the first management information;
   peripheral level 1 storage;
   a host processor to the level 0 and level 1 storage;
   management means coupled to the host processor for moving and/or copying the files on the second storage space, between level 0 and level 1 storage to balance performance, storage, and cost, using the first management information; and
   management means coupled to the host processor for moving and/or copying the filed on the first storage space, between level 0 and level 1 storage for the purpose of balancing performance, storage, and cost, using the second management information.

4. The data storage hierarchy of claim 3 wherein the first file system is a shared file system which dynamically allocates storage space among a plurality of first file system users as their files are stored therein and the second file system is a preallocated file system which allocates contiguous storage space to each of a plurality of second file system users prior to their files being stored therein.

5. A method for the storage management of data in a data storage hierarchy, the data storage hierarchy including at least one level 0 peripheral storage device having a first storage space having a plurality of files thereon organized according to a first file system and a second storage space having a plurality of files thereon organized according to a second file system, the first file system including a first catalog storing information associated with the files therein and the second file system including a second catalog storing information associated with the files therein, at least one level 1 storage device, and a host processor coupled to the level 0 and level 1 peripheral storage devices, the method comprising the machine-executed steps of:

creating an empty file on the first storage space for each file on the second storage space;

in response thereto, assigning a management class to each file on the second storage space and storing such in the first catalog;

assigning a management class to each file on the first storage space and storing such in the catalog of the first file system; and, moving and/or copying files on the first storage space, between level 0 and level 1 storage to balance performance, storage, and cost, according to their management classes stored in the catalog of the first file system;

moving and/or copying the files on the second storage space, between level 0 and level 1 storage for the purpose of balancing performance, storage and cost, according to their management classes associated with said empty files stored in the first catalog.

* * * * *